United States Patent [19]

Borsuk

[11] 3,927,925

[45] Dec. 23, 1975

[54] CONNECTOR ASSEMBLY

[76] Inventor: Leslie M. Borsuk, 11622 Kensington Road, Los Alamitos, Calif. 91316

[22] Filed: Nov. 19, 1973

[21] Appl. No.: 417,295

[52] U.S. Cl. ........... 339/14 P; 339/17 M; 339/22 B; 339/176 MP

[51] Int. Cl. ............................................ H01r 3/06

[58] Field of Search ........... 339/14 P, 17 L, 17 LM, 339/17 M, 17 R, 18 B, 18 C, 18 P, 18 R, 176 MP, 186 M, 14 R, 22 B

[56] References Cited

UNITED STATES PATENTS

| | | | |
|---|---|---|---|
| 3,212,049 | 10/1965 | Mittler et al. | 339/17 M X |
| 3,518,610 | 6/1970 | Goodman et al. | 339/176 MP X |
| 3,530,422 | 9/1970 | Goodman | 339/17 L |
| 3,787,712 | 1/1974 | Diersing | 339/22 B X |

*Primary Examiner*—Roy Lake
*Assistant Examiner*—DeWalden W. Jones

[57] ABSTRACT

A connector assembly comprising either a single or a double-sided printed circuit board superposed over voltage and ground planes. Electrical contacts are press-fit into plated-through holes formed in the printed circuit board. Openings are provided in the ground and voltage planes which are aligned with the plated-through holes. Bushings on the tail portions of selected contacts provide electrical and mechanical connection between such contacts and the ground and voltage planes. The assembly provides a ground/voltage distribution system of high capacitance and low impedance, and reduces the amount of wiring necessary to terminate the contacts.

18 Claims, 3 Drawing Figures

CONNECTOR ASSEMBLY

BACKGROUND OF THE INVENTION

This invention relates generally to an electrical connector assembly and, more particularly, to an electrical interconnecting system employing ground and voltage planes and a printed circuit board.

In digital computers, and other electronic data processing equipment it is conventional to plug printed circuit boards having various circuit components thereon into connectors mounted on the front face of a metal plate which serves to establish a ground plane for the electrical circuits on the printed circuit boards as well as to provide a mechanical support for the assembled printed circuit boards and connectors. Each connector comprises an insulator housing in which there is mounted a plurality of contacts each of which has a tail portion that pases through and extends beyond the rear face of the metal plate upon which the connector is mounted. The tail portions of the contacts are usually square or rectangular in cross-section of permitting conventional automatic back panel wiring techniques, such as solderless wrapping or the like, to be used to establish the required combinational network and to permit power and signal inputs to be applied to the network as well as signal outputs to be taken therefrom.

In an apparatus of this type, each printed circuit board generally requires one or more power inputs. Usually a voltage bus, in the form of a relatively heavy metal bar, innerconnects all the contacts mating with a particular conductive trace on the printed circuit board requiring power at the same voltage level. The disadvantage of this arrangement lies in its effect on the output impedance of the power supply. Such impedance is a function mainly of the capacitance of the voltage bus with respect to ground, and its inductance. Because this impedance loads the switching circuits on the printed board, it should be as low as possible in order to minimize its effect on pulse rise time and to keep from introducing limiting effects of the switching speed of the circuits.

In order to reduce this impedance by increasing the capacitance to ground and decreasing the inductance, a voltage plane can be utilized instead of the bus as a means to distribute power. Such voltage plane is in the form of a metal plate that normally underlies the ground plane and is separated therefrom by a thin insulation layer. This configuration, by its nature, provides a high capacitance to ground, and a low inductance and resistance, factors that prevent the voltage distribution system from adversely loading the circuitry on the printed circuit board.

U.S. Pat. No. 3,518,610 discloses a voltage/ground plane assembly of the type described hereinabove which utilizes metallic bushings to provide electrical and mechanical connection between selected electrical contacts and the respective ground and voltage planes. While such a system provides the desired high capacitance low impedance characteristics, it depends upon subsequent wire wrapping of the contact tails for terminating signal contacts, thus adding substantially to manufacturing time and cost.

Another arrangement for providing signal power and ground connections between electrical functional unts is known in the art as the "press-fit" system, such as disclosed in U.S. Pat. No. 3,737,838 to Mattingly et al., assigned to the assignee of the present application. In this system, contacts are press-fit into plated through holes formed in either single or double-sided printed circuit boards. Since a large number of signal traces may be formed on printed circuit boards, this arrangement has the advantage over the above-described voltage/ground plane assembly of not requiring as great amount of wiring, if any. However, this assembly has the disadvantage that in order to obtain a ground/voltage distribution system with high capacitance and low impedance, it must be fabricated in an expensive multilayer printed circuit board construction. Moreover, since the conductive traces on printed circuit boards are extremely thin, such boards have limited power carrying capacity, thus restricting their use as backpanels.

It is therefore the object of the present invention to overcome the attendant disadvantages of the two prior art connector systems discussed above by providing an arrangement which provides a low loss, high capacitance power/ground distribution system desirable in electronic packaging of computer data processing equipment, minimizes wiring procedures, yet is less expensive than conventional multi-layer printed circuit boards.

SUMMARY OF THE INVENTION

According to the principal aspect of the present invention, there is provided an electrical connector assembly comprising upper and lower superposed metallic layers separated by an insulation layer and adapted to be maintained at different potentials. In the preferred embodiment of the invention, the layers are self-supporting plates, one constituting a ground plane and the other a voltage plane. If desired, the voltage plate could be one or more bus bars. A printed circuit board is superposed over the metallic layers. A plurality of electrical contacts are press-fit into holes formed in the printed circuit board. Aligned openings are provided in the upper and lower metallic layers below the holes in the printed circuit board. The contacts embody tail portions which extend into such openings. In the preferred embodiment, metallic bushings are mounted on the tail portions of selected contacts to provide electrical and mechanical connection with the voltage and ground plates, respectively. In a modified form of the invention, the upper metallic layer is a conductive coating which is formed on the bottom surface of the printed circuit board and is electrically connected to a plated-through hole in the board. In this embodiment, bushings are provided on contacts for forming electrical and mechanical connectors only to the lower metal plate. In either arrangement, a heavy metallic conductor forms a voltage bus or plane which provides the assembly with high power carrying capacity. Preferably, the voltage and ground planes are coextensive so as to provide high capacitance and low impedance. Because a printed circuit board is utilized in the assembly of the invention, a large amount of electrical circuitry in the form of conductive traces may be formed thereon thus eliminating the necessity of a significant amount, if any, of wire wrapping or any other electrical connections to the tail portions of the contacts which extend through the backside of the plates. Thus, manufacturing costs are minimized.

Other aspects and advantages of the invention will become more apparent by reference to the following detailed description taken together with the accompanying drawings wherein like reference numerals designate like or corresponding parts throughout the various views.

DESCRIPTION OF THE PREFERRED EMBODIMENTS

Figures 1, 2, 3:
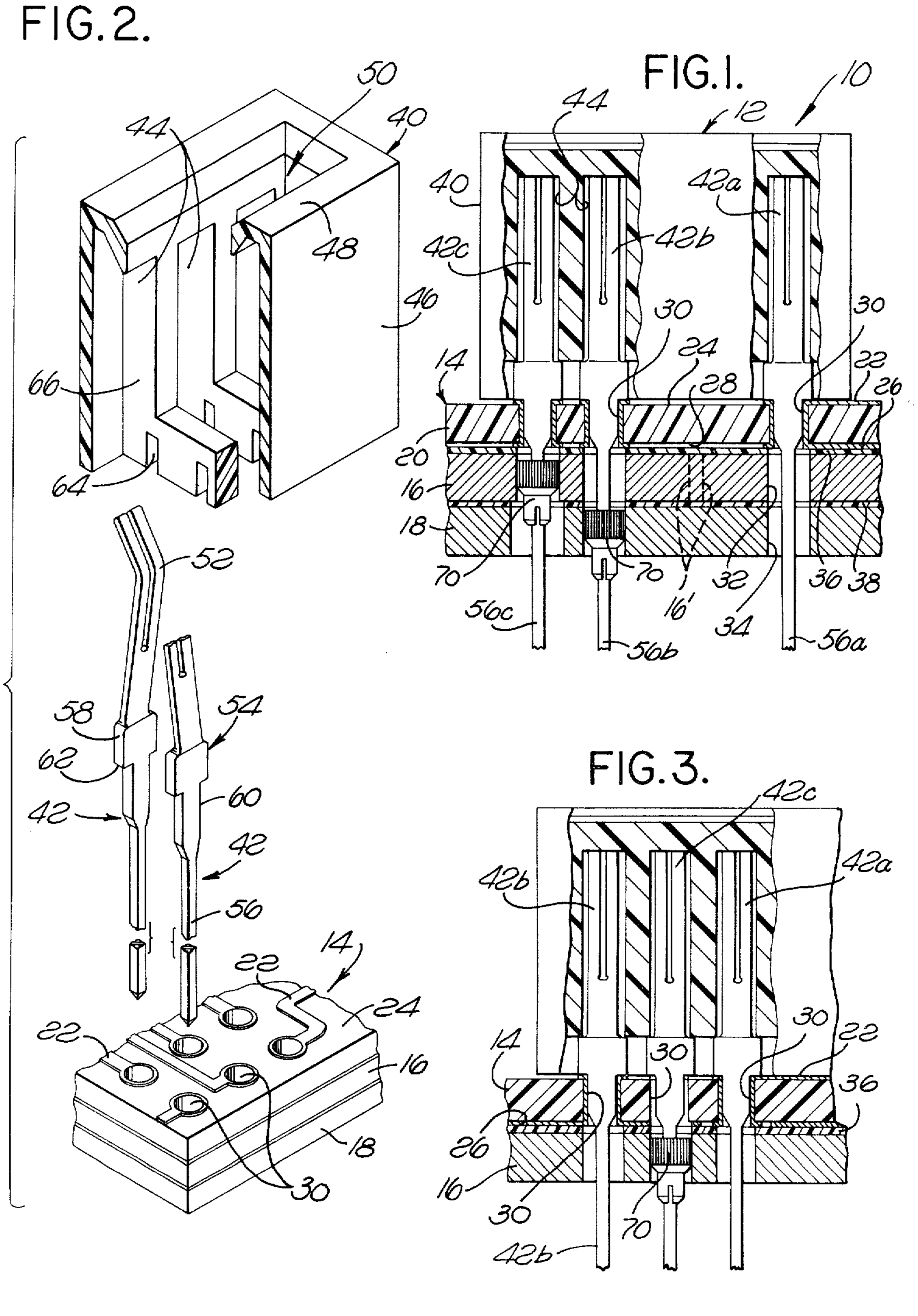
FIG. 1 is a partial vertical sectional view of the connector assembly of the present invention.
FIG. 2 is an exploded perspective view, partly in section, of the connector assembly showing the position of the parts thereof prior to assembly.
FIG. 3 is a fragmentary partial vertical sectional view of a modified form of the connector assembly of the invention.

Referring now to FIGS. 1 and 2 of the drawing in detail, there is illustrated the preferred embodiment of the connector assembly of the present invention, generally designated 10. The connector assembly comprises a connector 12 mounted on top of a printed circuit board 14 which overlies upper and lower superposed metallic layers 16 and 18. Preferably, the layers 16 and 18 are self-supporting metal plates which are coextensive with each other. The term "self-supporting plate" is to be distinguished from a conductive trace on a printed circuit board which is simply a thin coating and obviously is incapable of providing mechanical support. The plates 16 and 18 are maintained at different potentials, the plate at the lower potential being designated the "Ground Plane" and the plate at the higher potential being designated the "voltage plane." In FIG. 1, the plate 16 is preferably the voltage plane and the plate 18 the ground plane, although the polarity of the plates could be reversed if desired. Also, it is not entirely necessary in the present invention that the voltage plate 16 be a plane which is completely coextensive with the ground plane. For example, the plate 16 could be comprised of a pair of voltage buses, in the form of relatively heavy metal bars, interposed between the printed circuit board 14 and ground plane 18. The edges of two bus bars are indicated in phantom at 16' in FIG. 1.

The printed circuit board 14 may be either single or doublesided. In the embodiment illustrated in FIG. 1, the printed circuit board is double-sided and comprises a dielectric sheet 20 having conductive traces 22 on the upper surface 24 thereof and additional conductive traces 26 on the lower surface 28. The printed circuit board is formed with a plurality of rows of holes 30. Normally, all these holes will be plated-through, as shown. However, only the holes for the signal contacts in the connector 12 need be plated-through. The holes for the ground and voltage contacts in this embodiment may be bare. It is noted that the tracer 22 and 26 on the printed circuit board are connected to one of the plated-through holes. All the holes 30 are aligned with aligned openings 32 and 34 in the plates 16 and 18 respectively. A first insulation layer 36 separates the printed circuit board from the upper plate 16 and a second insulation layer 38 is interposed between the upper plate and the lower plate 18. The insulation layers 36 and 38 have holes therein aligned with the openings 32 and 34. The insulation layers may be thin sheets of plastic, such as polyvinylchloride.

The connector 12 comprises an insulator housing 40 which contains a plurality of contacts 42. The contacts are press-fit into the holes 30 in the printed circuit board. The particular form of the housing 40 and press-fit contacts 42 does not constitute a part of the present invention and may be of any conventional form such as is presently available on the market. In the example illustrated, the connector housing and contacts are generally of the form disclosed in the aforementioned Mattingly et al patent, but this is given by way of example only and not by limitation. Reference may be had to that patent for a detailed description of the contacts and connector housing. For the purpose of this description, it suffices to understand that the contacts 42 are mounted in opposed pairs in contact compartments 44 extending along the sidewalls 46 of the housing. The upper wall 48 of the housing is formed with a printed circuit board receiving slot 50. Each contact 42 includes an upper spring contacting portion 52, an intermediate mounting portion 54 and a lower portion or tail 56. The contacting portions 52 of the contacts extend into the slot 50 for engaging conductive pads on a printed circuit board (not shown) inserted into the slot. The mounting portion 54 of each contact includes an upper relatively wide section 58 and a lower more narrow section 60 defining therebetween a downwardly facing shoulder 62. The lower section 60 is dimensioned to have an interference fit with the holes 30. When a contact is fully positioned in one of such holes, the downwardly facing shoulder 62 lies adjacent to the upper surface 24 of the printed circuit board. The upper section 58 of the mounting portion of each contact extends into a downwardly facing slot 64 formed in a lateral wall 66 which separates each of the contact compartments 44. The slot 64 and upper section 58 of the mounting portion of each contact are dimensioned so that there is frictional engagement between the walls of the slot and such upper section. As a consequence, the connector housing 40 will be retained on the printed circuit board by its frictional engagement with the contacts.

The tails 56 of the contacts must be sufficiently long so that when the contacts are press-fit into the printed circuit board holes, with the shoulders 62 adjacent to the upper surface of the board, the tails will extend into the openings 32 and 34 in the plates 16 and 18, respectively. In the preferred embodiment of the invention, as illustrated in the drawing, the contacts are of conventional design and therefore embody wire-wrapped posts as tails which are sufficiently long to extend below the lower surface of the lower plate 18. Thus, the posts are available for conventional automatic backpanel wiring, but this is not necessary in the present invention inasmuchas the printed circuit board normally carries enough conductive traces to provide all the wiring necessary for the assembly. Nevertheless, the tails are left on the contacts to allow for wire wrapping for repair or design change purposes.

In FIG. 1, three contacts are illustrated, each of which performs a different function. These contacts are designated **42*a*, 42*b*, and 42*c*. The contact 42*a* is a signal contact since it is electrically connected to the conductive traces 22 and 26 on the printed circuit board by the plated-through hole 30 in which the contact is mounted. It is noted that the tail 56*a* of the signal contact 42*a* is spaced from the walls of the openings 32 and 34** and thus is isolated from the voltage and ground planes.

A metallic bushing 70 is mounted on the tail **56*b* of the contact 42*b* in the region of the opening 34 in the ground plane 18. This bushing has a frictional engagement with the tail 56*b* and an interference fit with the wall of the hole 34 so as to provide an electrical and mechanical connection between the contact 42***b* and the ground plane. Thus, contact 42*b* constitutes a ground contact. As can be seen in FIG. 1, the bushing 70 does not engage the voltage plane 16.

The tail 56*c* of the contact 42*c* carries another bushing 70 which has an interference fit with the opening 32 in the voltage plane 16. Thus, the contact 42*c* constitutes a voltage contact. While the lower portion of the bushing 70 extends into the opening 34 in the ground plane immediately therebelow, it has no connection to such plane. Preferably, the diameter of the hole 34 receiving the voltage contact 42*c* is greater than that of hole 32 to assure isolation between the voltage bushing and the ground plane 18.

It will be appreciated that the majority of the contacts will be signal contacts. Nevertheless, most backplane assemblies utilize a substantial number of voltage and ground contacts. This number is normally sufficient so that there will be an adequate number of ground and voltage bushings which, in cooperation with the press-fit of the contacts in the printed circuit board 14, will hold the printed circuit board and the voltage and ground planes as a unitary assembly without the requirement of any adhesive therebetween. Thus, the contacts and bushings perform not only electrical interconnecting functions, but also serve to mechanically hold the plates together. It will be understood however that if desired an adhesive may be utilized between the printed circuit board and the voltage and ground planes to form a laminated structure.

It will be appreciated that by the present invention there is provided a low loss, high capacitance power/-ground distribution system which does not require wire wrapping or other wiring techniques to achieve connection to signal contacts due to the use of a printed circuit board embodying substantial circuitry. Yet, the assembly is less expensive than presently available multi-layer printed circuit board constructions.

Reference is now made to FIG. 3 of the drawing which shows a modified form of the invention. In this embodiment, the printed circuit board 14 must be doubled-sided. The conductive trace 26 on the lower surface of the board is preferably a coating over the major portion of the surface. This coating is joined to the plated-through hole 30 which carries the ground contact 42*b* and thus constitutes a ground plane. The voltage contact 42*c* is mounted in a bare hole 30 and is joined to the voltage plane 16 by a bushing 70 as in the embodiment illustrated in FIG. 1. The signal contact 42*a* is press-fit into a plated-through hole 30 which is joined to a signal trace 22 on the printed circuit board but isolated from the coating 26 on the lower surface of the board. The insulation layer 36 isolates the voltage plane 16 from the ground plane 26. It will be appreciated that the polarity of the plane 26 and plate 16 could be reversed, thus making the plane 26 a voltage plane rather than a ground plane, but the power carrying capacity of the assembly would be limited due to the thinness of layer 26. In addition, the layer 26 could be only a conductive trace forming a ground bus so that the remaining lower surface of the printed circuit board could be used for signal traces. This arrangement however, would result in a lower capacitance, higher impedance system. Other modifications within the scope of the present invention will be apparent to those skilled in the art.

What is claimed is:

1. A connector assembly comprising:

upper and lower superposed metallic layers separated by an insulation layer and adapted to be maintained at different potentials, at least said lower layer being a self-supporting plate;

a printed circuit board superposed over said metallic layers;

a plurality of holes in said printed circuit board;

a plurality of openings in said layers aligned with said holes;

a plurality of contacts mounted in said aligned holes and openings, each said contact being press-fit into its corresponding hole and having a lower portion extending into its corresponding openings;

a metallic bushing on said lower portion of one of said contacts electrically and mechanically connecting said one contact to said lower layer; and another of said contacts being a signal contact, at least the hole in which said signal contact is press-fit being a plated-through hole.

2. A connector assembly as set forth in claim 1 wherein:

said upper layer is self-supporting plate separated from said printed circuit board by a second insulation layer; and a second metallic bushing is mounted on the lower portion of an additional one of said contacts electrically and mechanically connecting said additional contact to said upper layer.

3. A connector assembly as set forth in claim 2 wherein:

said self-supporting plates are voltage and ground planes substantially coextensive with each other.

4. A connector assembly as set forth in claim 1 wherein:

each said contact includes a spring contacting portion connected to said lower portion by a mounting portion, said mounting portion being positioned in said hole.

5. A connector assembly as set forth in claim 4 wherein:

said spring contacting portion of each said contact extends upwardly from said printed circuit board; and an insulator housing in the form of a hollow shell open to the bottom is mounted on said contacts and is retained on said printed circuit board by frictional engagement with the mounting portions of said contacts.

6. A connector assembly as set forth in claim 4 wherein:

said lower portion of each said contact is a wire-wrap post.

7. A connector assembly as set forth in claim 1 wherein:

said upper layer comprises at least one bus bar separated from said printed circuit board by a second insulation layer; and a second metallic bushing is mounted on the lower portion of an additional one said contacts electrically and mechanically connecting said additional contact to said bus bar.

8. A connector assembly as set forth in claim 1 wherein:

said printed circuit board is double-sided providing conductive traces on the upper and lower surfaces thereof, said conductive trace on said lower surface comprising said upper metallic layer; and another one of said holes is a plated-through hole and is electrically joined to said conductive trace on said lower surface.

9. A connector assembly as set forth in claim 8 wherein;

said conductive trace on said lower surface substantially covers said surface to define a metallic plane.

10. A connector assembly as set forth in claim 1 wherein:

said upper and lower layers and said printed circuit board are devoid of an adhesive therebetween.

11. A connector assembly as set forth in claim 1 wherein;

said holes in said printed circuit board are plated-through holes.

12. A connector assembly comprising:

upper and lower superposed metallic plates separated by an insulation layer and adapted to be maintained at different potentials;

a printed circuit board superposed over said plates and separated therefrom by a second insulation layer, said board having upper and lower surfaces with conductive traces on at least one of said surfaces;

a plurality of holes in said printed circuit board;

a plurality of aligned openings in said plates aligned with said holes;

first, second and third contacts mounted in said aligned holes and openings, each said contact being press-fit into its corresponding hole and having a lower portion extending into its corresponding openings;

a first metallic bushing on the lower portion of said first contact electrically and mechanically connecting said first contact to said upper plate;

a second metallic bushing on the lower portion of said second contact electrically and mechanically connecting said second contact to said lower plate; and said third is isolated from said upper and lower plates.

13. A connector assembly as set forth in claim 12 wherein;

said upper and lower plates are voltage and ground planes substantially coextensive with each other.

14. A connector assembly as set forth in claim 12 wherein:

said upper plate comprises at least one bus bar.

15. A connector assembly as set forth in claim 12 wherein:

said contacts and said bushings cooperate to mechanically hold said plates and printed circuit board together as a unitary assembly.

16. A connector assembly as set forth in claim 12 wherein:

at least some of said holes in said printed circuit board are plated-through holes.

17. A connector assembly as set forth in claim 16 wherein:

said third contact is press-fit into one of said plated-through holes.

18. A connector assembly as set forth in claim 17 wherein:

said printed circuit board has conductive traces on both its upper and lower surfaces; and said traces on said upper and lower surfaces are connected to said one plated-through hole.

* * * * *

UNITED STATES PATENT OFFICE

CERTIFICATE OF CORRECTION

PATENT NO. : 3,927,925

DATED : December 23, 1975

INVENTOR(S) : L. M. Borsuk

It is certified that error appears in the above-identified patent and that said Letters Patent are hereby corrected as shown below:

Column 8, line 8, -- contact -- should be inserted after "third".

Signed and Sealed this

*Twelfth* Day of *June 1984*

[SEAL]

*Attest:*

GERALD J. MOSSINGHOFF

*Attesting Officer* *Commissioner of Patents and Trademarks*